Jan. 18, 1966  R. E. CARLSON ETAL  3,229,911
SPRAY GUN FOR APPLYING A TWO-COMPONENT MIXTURE
Filed Sept. 5, 1963

INVENTORS:
RONALD E. CARLSON
WAYNE E. DERRICK
JAN H. DEAHL

United States Patent Office 3,229,911
Patented Jan. 18, 1966

3,229,911
SPRAY GUN FOR APPLYING A TWO-COMPONENT MIXTURE
Ronald E. Carlson, Scotch Plains, N.J., Wayne E. Derrick, Houston, Tex., and Jan H. Deahl, Cherry Hill, N.J., assignors to Shell Oil Company, New York, N.Y., a corporation of Delaware
Filed Sept. 5, 1963, Ser. No. 306,934
3 Claims. (Cl. 239—142)

This invention pertains to spray guns and more particularly to an internal mix spray gun adapted to apply a two-component liquid, for example, an epoxy resin and curing agent.

Several problems arise when conventional spray guns are used to apply a two-component mixture, as for example, a mixture of a plastic resin and a curing agent. The problems are extremely difficult in the case of plastic resin type foams as for example, polyurethane foam or epoxy foam. When the plastic foams are applied with a spray gun it is first necessary to mix intimately the resin and curing agent and then atomize the mixture with sufficient air to create the proper foam density. In the past, various internal-mix spray guns have been modified in an attempt to provide a suitable spray gun for applying two-component plastic foam. These modified spray guns have utilized various rotating devices to insure intimate mixing of the materials but have tended to clog with cured resin, necessitating the disassembly and cleaning of the spray gun. Of course, once the resin is mixed with the curing agent, the curing of the resin is initiated, thus the cured resin clogs the gun.

Accordingly, it is the principal object of this invention to provide a spray gun for applying two-component plastic foams, said gun having an improved mixing means that maintains the spray gun relatively free of cured plastic.

A further object of this invention is to provide an internal-mix spray gun having a mixing chamber with two meshed spur gears disposed therein. The spur gears are positioned to intimately mix the resin and its curing agent and then discharge the resin and curing agent to a chamber where it may be atomized by an air stream.

The above objects and advantages of this invention are achieved by providing an internal-mix spray gun having a mixing chamber formed therein. Two meshed spur gears are disposed in the mixing chamber with one of the gears being driven by a suitable motor means. A plurality of passageways are used to supply the various components of the foam mixture to the chamber in which the spur gears are mounted. The passageways are provided with valve means for controlling the fluid flow therethrough. The spur gears pick up and intimately mix the two components of the foam due to their intermeshing and shearing action. The mixture is then discharged from the spur gears to a nozzle assembly where compressed air is admitted to break up the mixture into small liquid droplets and spray it into the atmosphere for application on the desired surface. The use of the spur gears provides a means by which the resin and its curing agent may be intimately mixed while at the same time providing a means for clearing the mixing chamber of partially cured resin and the like. In addition to the three passageways for supplying the resin, curing agent and compressed air, a fourth passageway is provided in order that a solvent mixture may be passed through the spray gun to clean the gun after use.

The above objects and advantages of this invention will be more easily understood by those skilled in the art from the following detailed description when taken in conjunction with the attached drawing in which.

Figure 1:
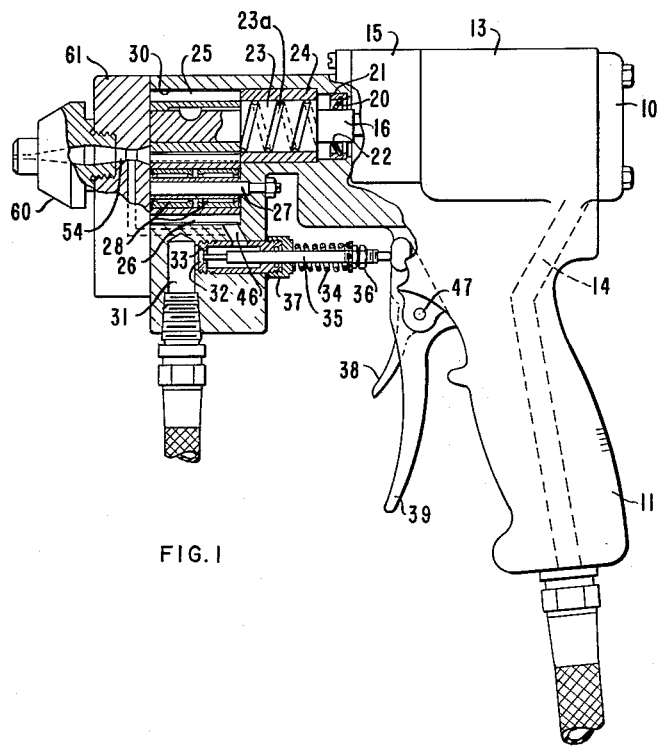
FIGURE 1 is an elevation view partially in section of a spray gun constructed in accordance with this invention.

Referring to FIGURE 1, there is shown a spray gun having a housing 10 with a handle 11 extending therefrom. The right hand portion of the housing is provided with a chamber or recess for receiving an air motor 13 that is used for driving the remainder of the gun assembly as explained below. A passageway 14 is formed in the handle and gun housing for supplying the compressed air for powering the motor 13. A reduction gear assembly 15 is mounted in the housing to the left of the motor 13 and coupled to the shaft of the motor. The reduction gear assembly is preferably of the planetary gear type and a set screw which treads into an opening in the housing is used to lock the outer case of the reduction gear in place. A shaft 16 extends from the left of the reduction gear housing and is provided with a shaft seal 20 for isolating the mixing portion of the gun from the air motor and the reduction gear assembly. The shaft seal 20 consists of an angular ring-shaped member formed from a flexible plastic material as, for example, tetrafluoroethylene polymer sold under the trade name of Teflon. The angular member is secured at its outer edge to a ring-shaped metallic member 21 which is a press fit in a recess formed in the gun housing while the inner edge 22 terminates in a thin tapered edge that bears against the shaft 16 to form an effective seal.

The shaft 16 carries for rotation therewith a shaft 23 which is rotatably supported in a journal bearing 24 disposed in the housing 10. The portion of the shaft 23 journaled in the bearing 24 is provided with a helical shape groove 23a on its outer surface to insure that the material being mixed in the mixing chamber of the gun will flow towards the left as shown in FIGURE 1. This insures that the remainder of the gun will be maintained relatively free of the materials being mixed. A drive gear 25 is mounted on the left hand end of shaft 16 with the drive gear meshing with an idler gear 26. The gears 25 and 26 are preferably spur gears and are used to intimately mix the two components of the material being sprayed. The idler gear 26 is supported on a stub shaft 27 by means of roller bearings 28. The spur gears 25 and 26 rotate in a mixing chamber 30 formed in the gun housing 10. As is seen in FIGURE 2, the chamber 30 is formed in substantially the same outline as the two meshed gears.

Figure 2:
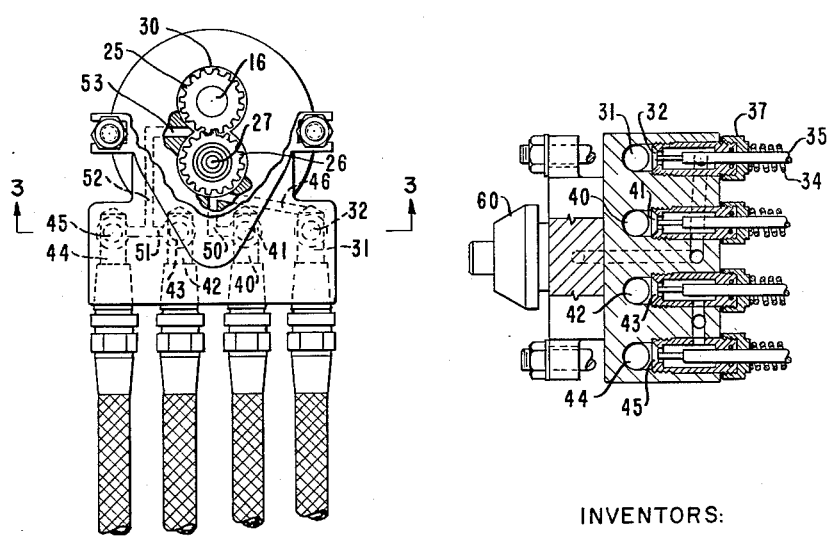
FIGURE 2 is a partial front view of the spray gun showing various conduits for supplying the liquid components to the spray gun assembly; and, FIGURE 3 is a partial horizontal section of the spray gun shown in FIGURE 1 taken along line 3—3 of FIGURE 2 and showing the valve means for controlling the flow of materials to the spray gun.
Figure 3:
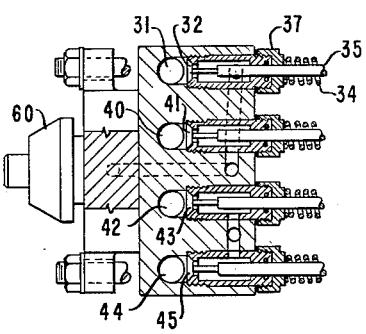

Referring now to FIGURES 2 and 3, there is shown a plurality of passageways 31, 40, 42 and 44 formed in the front portion of the gun housing and adapted to supply the various materials or liquids to the mixing chamber 30. Each of the passageways are supplied with a valve to control the flow of material to the mixing chamber 30 and spray nozzle of the gun, the valves being similar to the valve 32 for the passageway 31 shown in FIGURE 1. The valve 32 includes a conically shaped head that seats in a valve seat 33 disposed in the gun housing. The valve is normally biased to the right or closed position by means of a compression spring 34 disposed around the valve stem 35. The valve stem 35 is guided in a guide bushing 37 disposed on the gun housing 10 and seals the valve stem to the housing. The stem carries a lock nut 36 against which the spring 35 bears. The valve 32 is opened by means of a cam surface formed on the trigger 39 which is in turn, pivotally mounted on a shaft 47. The remainder of the passageways 40, 42 and 44 are controlled by similar valves 41, 43 and 45 as shown in FIGURES 2 and 3. In addition, a plurality of cam surfaces are provided on the trigger 39 for opening the valves 41 and 45 in order to control the supply of materials to the mixing chamber 30 and spray nozzle while a second trigger 38 is provided for opening the valve 43.

The side of the valve 32 away from the passageway 31 communicates by means of a passageway 46 with the lower part of the mixing chamber 30. As shown in FIGURE 2, the passageway 46 communicates with the outer surface of the lower or idler gear 26. Normally, the passageway 31 is coupled or connected to the supply of one of the materials of the two component system. For example, when a resin requiring a curing agent is sprayed, the resin is normally supplied through the passageway 31, and the passageway 44 is used to supply the curing agent. As shown in FIGURE 2, the passageway 44 communicates with the intermediate level of the mixing chamber 30 by means of a passageway 52 formed in the gun housing. The passageway 52 opens at a point 53 adjacent that at which the gears 25 and 26 mesh. Thus, the curing agent is supplied directly to the resin just before the gears mesh and as the gears mesh they intimately mix the curing agent with the resin and discharge it directly into the spray or atomizing chamber 54 positioned on the front or left hand end of the gun as shown in FIGURE 1. The compressed air used for atomizing the mixture is supplied by the passageway 40 shown in FIGURE 2. When the valve 41 is opened, it communicates with the atomizing chamber by means of a passageway. The atomizing chamber 54 is of conventional design, such as is found on all spray guns of the internal-mix type. Thus, the construction of the atomizing chamber will not be described in detail. The atomizing chamber 54 is provided with a nozzle assembly 60 that is threadedly attached to a closure plate 61 which contains part of the atomizing chamber. The nozzle discharges the atomized resin and curing agent mixture onto the desired surface. The nozzle assembly 60 is also of conventional construction and thus it is not described further.

Whenever a two-component mixture is utilized as, for example, a resin and curing agent mixture, it is necessary to remove the mixture from the gun assembly after the gun is used to prevent the mixture from hardening in the gun assembly. In order to supply a suitable solvent to the gun assembly the passageway 42 communicates by means of a passageway 51 with the passageway 52. Thus, solvent may be supplied to the passageway 42 when it is desired to clean the gun. As shown in FIGURE 2, the solvent will be supplied directly to the spur gears at the point at which they mesh. Since this is also the point at which the curing agent is mixed with the resin, it will insure that the two-component mixture is completely cleared from the gun after the gun has been used.

From the above description it is easily seen that this invention provides a unique mixing assembly for a spray gun adapted to apply a two-component mixture to a surface. More particularly, the invention utilizes a motor means for driving a set of spur gears to intimately mix the two components of the mixture. The two components are supplied to the mixing chamber in positions that insure an intimate mixing of the components as they pass through the meshing spur gears. The spur gears due to their action tend to shear the two components of the mixture thus insuring a complete mixing thereof. In addition, the gun assembly is provided with an adequate sealing means to insure that the two components of the mixture do not flow into the remainder of the gun assembly but instead flow into the atomizing chamber of the gun where the compressed air can completely atomize the mixture. Further, by providing a passageway whereby a solvent mixture may be introduced to clean the two gears that form the mixing means the necessity for disassembling the gun to clean the mixing assembly has been eliminated. The solvent mixture in addition cleans the atomizing chamber thus further eliminating the need to disassemble the gun.

The term spur gear as used in the above description includes helical and herringbone gears as well as straight tooth spur gears. The only requirement for the gears used in this invention being that they mesh to intimately mix the two components.

We claim as our invention:
1. An internal-mix spray gun for uniformly mixing and applying a resin and curing agent to produce a cellular foam structure, said spray gun comprising:
    a housing having a mixing chamber formed in the forward portion thereof, a pair of meshed spurred gears disposed in said mixing chamber, the wall of said mixing chamber conforming substantially to the outline of said meshed gears;
    an air motor, said motor being disposed in the rear portion of said housing and having a shaft means extending into said mixing chamber, said shaft means being coupled one of said spur gears in a driving arrangement;
    a seal means, said seal means surrounding said shaft means and isolating said rear portion of the housing from the forward portion;
    at least two inlet passageways formed in said housing, one of said passageways communicating with said mixing chamber adjacent the point at which the gears mesh, the other passageway communicating with said mixing chamber adjacent the outer periphery of said gears;
    valve means disposed in each passageway to control the flow therethrough; and
    a discharge orifice, said discharge orifice extending from the forward portion of said housing and communicating with said mixing chamber.
2. The spray gun of claim 1 in which one of the inlet passageways is connected to an inlet which supplies a plastic resin to said mixing chamber and the other of said inlet passageways to an inlet which supplies a curing agent to said mixing chamber.
3. The spray gun of claim 1 in which four inlet passageways are formed in the housing, two of said passageways being connected to inlets which supply the resin and curing agent, respectively, to said mixing chamber, one of said passageways is connected to an inlet which supplies a solvent to said mixing chamber, an atomizing chamber, said atomizing chamber being attached to said housing and communicating with said mixing chamber, the last of said passageways being connected to an inlet which supplies compressed air to said atomizing chamber.

References Cited by the Examiner
UNITED STATES PATENTS

| | | | |
|---|---|---|---|
| 2,970,773 | 2/1961 | Keryluk et al. | 239—142 |
| 3,035,775 | 5/1962 | Edwards et al. | 239—142 |
| 3,053,457 | 9/1962 | Trumbull et al. | 239—142 |
| 3,093,311 | 6/1963 | Morris et al. | 239—142 |
| 3,122,322 | 2/1964 | Nieman et al. | 239—142 |
| 3,123,306 | 3/1964 | Bradley | 239—142 |
| 3,142,476 | 7/1964 | Goodwin | 259—6 |
| 3,152,792 | 10/1964 | Goodwin | 259—6 |

M. HENSON WOOD, JR., *Primary Examiner.*

EVERETT W. KIRBY, *Examiner.*